US010778576B2

(12) United States Patent
Pfister et al.

(10) Patent No.: US 10,778,576 B2
(45) Date of Patent: *Sep. 15, 2020

(54) SYSTEM AND METHOD FOR PROVIDING A BIT INDEXED SERVICE CHAIN

(71) Applicant: Cisco Technology, Inc., San Jose, CA (US)

(72) Inventors: Pierre Pfister, Angers (FR); Mark Townsley, Paris (FR); Yoann Desmouceaux, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/249,563

(22) Filed: Jan. 16, 2019

(65) Prior Publication Data

US 2019/0149468 A1 May 16, 2019

Related U.S. Application Data

(63) Continuation of application No. 15/465,764, filed on Mar. 22, 2017, now Pat. No. 10,225,187.

(51) Int. Cl.
H04L 12/741 (2013.01)
H04L 29/06 (2006.01)

(52) U.S. Cl.
CPC .............. H04L 45/74 (2013.01); H04L 69/22 (2013.01)

(58) Field of Classification Search
CPC ......... H04L 45/16; H04L 45/50; H04L 45/74; H04L 45/745; H04L 12/18
See application file for complete search history.

(56) References Cited

U.S. PATENT DOCUMENTS 3,629,512 A 12/1971 Yuan
4,769,811 A 9/1988 Eckberg, Jr. et al.
(Continued)

FOREIGN PATENT DOCUMENTS

CN 103716123 4/2014
CN 103716137 4/2014
(Continued)

OTHER PUBLICATIONS

Aldrin, S., et al. "Service Function Chaining Operation, Administration and Maintenance Framework," Internet Engineering Task Force, Oct. 26, 2014, 13 pages.
(Continued)

Primary Examiner — Jung H Park
(74) Attorney, Agent, or Firm — Polsinelli PC

(57) ABSTRACT

Disclosed is a method that modifies a bit indexed explicit replication (BIER) algorithm. The method includes receiving a packet at a node, wherein the packet includes a BIER header identifying a bitstring, the bitstring including a first bit indicating a first destination and a second bit indicating a second destination and forwarding the packet through one or more networks toward the first destination and the second destination based on the bitstring and a predetermined bit selection order. The predetermined bit selection order causes a sequential delivery of the packet to the first destination and the second destination. After the packet arrives at the first destination, the method includes setting the first bit to zero in the bitstring and forwarding the packet through the one or more networks toward the second destination according to the updated bitstring.

20 Claims, 8 Drawing Sheets

(56) References Cited

U.S. PATENT DOCUMENTS

| | | |
|---|---|---|
| 5,408,231 A | 4/1995 | Bowdon |
| 5,491,690 A | 2/1996 | Alfonsi et al. |
| 5,557,609 A | 9/1996 | Shobatake et al. |
| 5,600,638 A | 2/1997 | Bertin et al. |
| 5,687,167 A | 11/1997 | Bertin et al. |
| 6,115,384 A | 9/2000 | Parzych |
| 6,167,438 A | 12/2000 | Yates et al. |
| 6,400,681 B1 | 6/2002 | Bertin et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | Mcfarland et al. |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas et al. |
| 7,231,462 B2 | 6/2007 | Berthaud et al. |
| 7,333,990 B1 | 2/2008 | Thiagarajan et al. |
| 7,443,796 B1 | 10/2008 | Albert et al. |
| 7,458,084 B2 | 11/2008 | Zhang et al. |
| 7,472,411 B2 | 12/2008 | Wing et al. |
| 7,486,622 B2 | 2/2009 | Regan et al. |
| 7,536,396 B2 | 5/2009 | Johnson et al. |
| 7,552,201 B2 | 6/2009 | Areddu et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad et al. |
| 7,610,375 B2 | 10/2009 | Portolani et al. |
| 7,643,468 B1 | 1/2010 | Arregoces et al. |
| 7,644,182 B2 | 1/2010 | Banerjee et al. |
| 7,647,422 B2 | 1/2010 | Singh et al. |
| 7,657,898 B2 | 2/2010 | Sadiq |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,751,409 B1 | 7/2010 | Carolan |
| 7,793,157 B2 | 9/2010 | Bailey et al. |
| 7,814,284 B1 | 10/2010 | Glass et al. |
| 7,831,693 B2 | 11/2010 | Lai |
| 7,852,785 B2 | 12/2010 | Lund et al. |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,908,480 B2 | 3/2011 | Firestone et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda et al. |
| 8,095,683 B2 | 1/2012 | Balasubramaniam Chandra |
| 8,116,307 B1 | 2/2012 | Thesayi et al. |
| 8,166,465 B2 | 4/2012 | Feblowitz et al. |
| 8,180,909 B2 | 5/2012 | Hartman et al. |
| 8,191,119 B2 | 5/2012 | Wing et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,355,332 B2 | 1/2013 | Beaudette et al. |
| 8,442,043 B2 | 5/2013 | Sharma et al. |
| 8,451,817 B2 | 5/2013 | Cheriton |
| 8,464,336 B2 | 6/2013 | Wei et al. |
| 8,473,981 B1 | 6/2013 | Gargi |
| 8,479,298 B2 | 7/2013 | Keith et al. |
| 8,498,414 B2 | 7/2013 | Rossi |
| 8,520,672 B2 | 8/2013 | Guichard et al. |
| 8,601,152 B1 | 12/2013 | Chou |
| 8,605,588 B2 | 12/2013 | Sankaran et al. |
| 8,612,612 B1 | 12/2013 | Dukes et al. |
| 8,627,328 B2 | 1/2014 | Mousseau et al. |
| 8,645,952 B2 | 2/2014 | Biswas et al. |
| 8,676,965 B2 | 3/2014 | Gueta |
| 8,676,980 B2 | 3/2014 | Kreeger et al. |
| 8,700,892 B2 | 4/2014 | Bollay et al. |
| 8,724,466 B2 | 5/2014 | Kenigsberg et al. |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian et al. |
| 8,792,490 B2 | 7/2014 | Jabr et al. |
| 8,793,400 B2 | 7/2014 | Mcdysan et al. |
| 8,812,730 B2 | 8/2014 | Vos et al. |
| 8,819,419 B2 | 8/2014 | Carlson et al. |
| 8,825,070 B2 | 9/2014 | Akhtar et al. |
| 8,830,834 B2 | 9/2014 | Sharma et al. |
| 8,904,037 B2 | 12/2014 | Haggar et al. |
| 8,984,284 B2 | 3/2015 | Purdy, Sr. et al. |
| 9,001,827 B2 | 4/2015 | Appenzeller |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | Mcdysan |
| 9,178,812 B2 | 11/2015 | Guichard et al. |
| 9,189,285 B2 | 11/2015 | Ng et al. |
| 9,203,711 B2 | 12/2015 | Agarwal et al. |
| 9,253,274 B2 | 2/2016 | Quinn et al. |
| 9,300,579 B2 | 3/2016 | Frost et al. |
| 9,300,585 B2 | 3/2016 | Kumar et al. |
| 9,311,130 B2 | 4/2016 | Christenson et al. |
| 9,319,324 B2 | 4/2016 | Beheshti-Zavareh et al. |
| 9,325,565 B2 | 4/2016 | Yao et al. |
| 9,338,097 B2 | 5/2016 | Anand et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,385,950 B2 | 7/2016 | Quinn et al. |
| 9,398,486 B2 | 7/2016 | La Roche, Jr. et al. |
| 9,407,540 B2 | 8/2016 | Kumar et al. |
| 9,413,655 B2 | 8/2016 | Shatzkamer et al. |
| 9,424,065 B2 | 8/2016 | Singh et al. |
| 9,436,443 B2 | 9/2016 | Chiosi et al. |
| 9,438,432 B2 | 9/2016 | Shepherd et al. |
| 9,444,675 B2 | 9/2016 | Guichard et al. |
| 9,473,570 B2 | 10/2016 | Bhanujan et al. |
| 9,479,443 B2 | 10/2016 | Bosch et al. |
| 9,491,094 B2 | 11/2016 | Patwardhan et al. |
| 9,537,836 B2 | 1/2017 | Maller et al. |
| 9,558,029 B2 | 1/2017 | Behera et al. |
| 9,559,970 B2 | 1/2017 | Kumar et al. |
| 9,571,405 B2 | 2/2017 | Pignataro et al. |
| 9,608,896 B2 | 3/2017 | Kumar et al. |
| 9,614,739 B2 | 4/2017 | Kumar et al. |
| 9,660,909 B2 | 5/2017 | Guichard et al. |
| 9,723,106 B2 | 8/2017 | Shen et al. |
| 9,774,533 B2 | 9/2017 | Zhang et al. |
| 9,794,379 B2 | 10/2017 | Kumar et al. |
| 9,882,776 B2 | 1/2018 | Aybay et al. |
| 9,929,945 B2 | 3/2018 | Schultz et al. |
| 10,003,530 B2 | 6/2018 | Zhang et al. |
| 2001/0023442 A1 | 9/2001 | Masters |
| 2002/0085562 A1 | 7/2002 | Hufferd et al. |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0026257 A1 | 2/2003 | Xu et al. |

(56) References Cited

U.S. PATENT DOCUMENTS

| | | |
|---|---|---|
| 2003/0037070 A1 | 2/2003 | Marston |
| 2003/0088698 A1 | 5/2003 | Singh et al. |
| 2003/0110081 A1 | 6/2003 | Tosaki et al. |
| 2003/0120816 A1 | 6/2003 | Berthaud et al. |
| 2003/0214913 A1 | 11/2003 | Kan et al. |
| 2003/0226142 A1 | 12/2003 | Rand |
| 2004/0109412 A1 | 6/2004 | Hansson et al. |
| 2004/0148391 A1 | 7/2004 | Lake, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0094397 A1 | 4/2007 | Krelbaum et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0037713 A1 | 2/2009 | Khalid et al. |
| 2009/0094684 A1 | 4/2009 | Chinnusamy et al. |
| 2009/0169001 A1* | 7/2009 | Tighe ................. H04L 9/34 380/217 |
| 2009/0204612 A1 | 8/2009 | Keshavarz-nia et al. |
| 2009/0271656 A1 | 10/2009 | Yokota et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0058329 A1 | 3/2010 | Durazzo et al. |
| 2010/0063988 A1 | 3/2010 | Khalid |
| 2010/0080226 A1 | 4/2010 | Khalid |
| 2010/0165985 A1 | 7/2010 | Sharma et al. |
| 2010/0191612 A1 | 7/2010 | Raleigh |
| 2010/0211658 A1 | 8/2010 | Hoogerwerf et al. |
| 2011/0023090 A1 | 1/2011 | Asati et al. |
| 2011/0032833 A1 | 2/2011 | Zhang et al. |
| 2011/0055845 A1 | 3/2011 | Nandagopal et al. |
| 2011/0131338 A1 | 6/2011 | Hu |
| 2011/0137991 A1 | 6/2011 | Russell |
| 2011/0142056 A1 | 6/2011 | Manoj |
| 2011/0161494 A1 | 6/2011 | Mcdysan et al. |
| 2011/0222412 A1 | 9/2011 | Kompella |
| 2011/0255538 A1 | 10/2011 | Srinivasan et al. |
| 2011/0267947 A1 | 11/2011 | Dhar et al. |
| 2012/0131662 A1 | 5/2012 | Kuik et al. |
| 2012/0147894 A1 | 6/2012 | Mulligan et al. |
| 2012/0324442 A1 | 12/2012 | Barde |
| 2012/0331135 A1 | 12/2012 | Alon et al. |
| 2013/0003735 A1 | 1/2013 | Chao et al. |
| 2013/0003736 A1 | 1/2013 | Szyszko et al. |
| 2013/0040640 A1 | 2/2013 | Chen et al. |
| 2013/0044636 A1 | 2/2013 | Koponen et al. |
| 2013/0121137 A1 | 5/2013 | Feng et al. |
| 2013/0124708 A1 | 5/2013 | Lee et al. |
| 2013/0163594 A1 | 6/2013 | Sharma et al. |
| 2013/0163606 A1 | 6/2013 | Bagepalli et al. |
| 2013/0238806 A1 | 9/2013 | Moen |
| 2013/0272305 A1 | 10/2013 | Lefebvre et al. |
| 2013/0311675 A1 | 11/2013 | Kancherla |
| 2013/0329584 A1 | 12/2013 | Ghose et al. |
| 2014/0010083 A1 | 1/2014 | Hamdi et al. |
| 2014/0010096 A1 | 1/2014 | Kamble et al. |
| 2014/0036730 A1 | 2/2014 | Nellikar et al. |
| 2014/0050223 A1 | 2/2014 | Foo et al. |
| 2014/0067758 A1 | 3/2014 | Boldyrev et al. |
| 2014/0105062 A1 | 4/2014 | McDysan et al. |
| 2014/0181267 A1 | 6/2014 | Wadkins et al. |
| 2014/0254603 A1 | 9/2014 | Banavalikar et al. |
| 2014/0259012 A1 | 9/2014 | Nandlall et al. |
| 2014/0279863 A1 | 9/2014 | Krishnamurthy et al. |
| 2014/0280836 A1 | 9/2014 | Kumar et al. |
| 2014/0317261 A1 | 10/2014 | Shatzkamer et al. |
| 2014/0321459 A1 | 10/2014 | Kumar et al. |
| 2014/0334295 A1 | 11/2014 | Guichard et al. |
| 2014/0344439 A1 | 11/2014 | Kempf et al. |
| 2014/0362682 A1 | 12/2014 | Guichard et al. |
| 2014/0362857 A1 | 12/2014 | Guichard et al. |
| 2014/0369209 A1 | 12/2014 | Khurshid et al. |
| 2014/0376558 A1 | 12/2014 | Rao et al. |
| 2015/0003455 A1 | 1/2015 | Haddad et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0071285 A1 | 3/2015 | Kumar et al. |
| 2015/0074276 A1 | 3/2015 | DeCusatis et al. |
| 2015/0082308 A1 | 3/2015 | Kiess et al. |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092564 A1 | 4/2015 | Aldrin |
| 2015/0103827 A1 | 4/2015 | Quinn et al. |
| 2015/0117308 A1 | 4/2015 | Kant |
| 2015/0124622 A1 | 5/2015 | Kovvali et al. |
| 2015/0131484 A1 | 5/2015 | Aldrin |
| 2015/0131660 A1 | 5/2015 | Shepherd |
| 2015/0156035 A1 | 6/2015 | Foo et al. |
| 2015/0180725 A1 | 6/2015 | Varney et al. |
| 2015/0180767 A1 | 6/2015 | Tam et al. |
| 2015/0181309 A1 | 6/2015 | Shepherd et al. |
| 2015/0188949 A1 | 7/2015 | Mahaffey et al. |
| 2015/0195197 A1 | 7/2015 | Yong et al. |
| 2015/0222516 A1 | 8/2015 | Deval et al. |
| 2015/0222533 A1 | 8/2015 | Birrittella et al. |
| 2015/0236948 A1 | 8/2015 | Dunbar et al. |
| 2015/0319078 A1 | 11/2015 | Lee et al. |
| 2015/0319081 A1 | 11/2015 | Kasturi et al. |
| 2015/0326473 A1 | 11/2015 | Dunbar et al. |
| 2015/0333930 A1 | 11/2015 | Aysola et al. |
| 2015/0334027 A1 | 11/2015 | Bosch et al. |
| 2015/0341285 A1 | 11/2015 | Aysola et al. |
| 2015/0365495 A1 | 12/2015 | Fan et al. |
| 2015/0381465 A1 | 12/2015 | Narayanan et al. |
| 2015/0381557 A1 | 12/2015 | Fan et al. |
| 2016/0028604 A1 | 1/2016 | Chakrabarti et al. |
| 2016/0028640 A1 | 1/2016 | Zhang et al. |

(56) References Cited

U.S. PATENT DOCUMENTS

| | | |
|---|---|---|
| 2016/0043952 A1 | 2/2016 | Zhang et al. |
| 2016/0050117 A1 | 2/2016 | Voellmy et al. |
| 2016/0050132 A1 | 2/2016 | Zhang |
| 2016/0080263 A1 | 3/2016 | Park et al. |
| 2016/0080496 A1 | 3/2016 | Falanga et al. |
| 2016/0099853 A1 | 4/2016 | Nedeltchev et al. |
| 2016/0119159 A1 | 4/2016 | Zhao et al. |
| 2016/0119253 A1 | 4/2016 | Kang et al. |
| 2016/0127139 A1 | 5/2016 | Tian et al. |
| 2016/0134518 A1* | 5/2016 | Callon ............ H04L 45/24 370/390 |
| 2016/0134535 A1 | 5/2016 | Callon |
| 2016/0139939 A1 | 5/2016 | Bosch et al. |
| 2016/0164776 A1 | 6/2016 | Biancaniello |
| 2016/0165014 A1 | 6/2016 | Nainar et al. |
| 2016/0173373 A1 | 6/2016 | Guichard et al. |
| 2016/0173464 A1 | 6/2016 | Wang et al. |
| 2016/0182336 A1 | 6/2016 | Doctor et al. |
| 2016/0182342 A1 | 6/2016 | Singaravelu et al. |
| 2016/0182684 A1 | 6/2016 | Connor et al. |
| 2016/0212017 A1 | 7/2016 | Li et al. |
| 2016/0226742 A1 | 8/2016 | Apathotharanan et al. |
| 2016/0248685 A1 | 8/2016 | Pignataro et al. |
| 2016/0277250 A1 | 9/2016 | Maes |
| 2016/0285720 A1 | 9/2016 | Mäenpää et al. |
| 2016/0323165 A1 | 11/2016 | Boucadair et al. |
| 2016/0352629 A1 | 12/2016 | Wang et al. |
| 2016/0380966 A1 | 12/2016 | Gunnalan et al. |
| 2017/0019303 A1 | 1/2017 | Swamy et al. |
| 2017/0031804 A1 | 2/2017 | Ciszewski et al. |
| 2017/0078175 A1 | 3/2017 | Xu et al. |
| 2017/0187609 A1 | 6/2017 | Lee et al. |
| 2017/0208000 A1 | 7/2017 | Bosch et al. |
| 2017/0214627 A1 | 7/2017 | Zhang et al. |
| 2017/0237656 A1 | 8/2017 | Gage et al. |
| 2017/0250917 A1 | 8/2017 | Ruckstuhl et al. |
| 2017/0272470 A1 | 9/2017 | Gundamaraju et al. |
| 2017/0279712 A1 | 9/2017 | Nainar et al. |
| 2017/0310611 A1 | 10/2017 | Kumar et al. |
| 2017/0331741 A1 | 11/2017 | Fedyk et al. |
| 2018/0013841 A1 | 1/2018 | Nainar et al. |
| 2018/0026884 A1 | 1/2018 | Nainar et al. |
| 2018/0026887 A1 | 1/2018 | Nainar et al. |
| 2018/0041470 A1 | 2/2018 | Schultz et al. |
| 2018/0062991 A1 | 3/2018 | Nainar et al. |

FOREIGN PATENT DOCUMENTS

| | | |
|---|---|---|
| EP | 3160073 | 4/2017 |
| JP | 2016149686 | 8/2016 |
| WO | WO 2011/029321 | 3/2011 |
| WO | WO 2012/056404 | 5/2012 |
| WO | WO 2015/065353 | 5/2015 |
| WO | WO 2015/180559 | 12/2015 |
| WO | WO 2015/187337 | 12/2015 |
| WO | WO 2016/004556 | 1/2016 |
| WO | WO 2016/058245 | 4/2016 |
| WO | WO 2017/011607 | 1/2017 |

OTHER PUBLICATIONS

Alizadeh, Mohammad, et al., "CONGA: Distributed Congestion-Aware Load Balancing for Datacenters," SIGCOMM '14, Aug. 17-22, 2014, 12 pages.
Author Unknown, "ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.
Author Unknown, "AWS Lambda Developer Guide," Amazon Web Services Inc., May 2017, 416 pages.
Author Unknown, "CEA-708," from Wikipedia, the free encyclopedia, Nov. 15, 2012; 16 pages http://en.wikipedia.org/w/index.php?title=CEA-708&oldid=523143431.
Author Unknown, "Cisco and Intel High-Performance VNFs on Cisco NFV Infrastructure," White Paper, Cisco and Intel, Oct. 2016, 7 pages.
Author Unknown, "Cloud Functions Overview," Cloud Functions Documentation, Mar. 21, 2017, 3 pages; https://cloud.google.com/functions/docs/concepts/overview.
Author Unknown, "Cloud-Native VNF Modelling," Open Source Mano, © ETSI 2016, 18 pages.
Author Unknown, "Digital Program Insertion," from Wikipedia, the free encyclopedia, Jan. 2, 2012; 1 page http://en.wikipedia.org/w/index.php?title=Digital_Program_Insertion&oldid=469076482.
Author Unknown, "Dynamic Adaptive Streaming over HTTP," from Wikipedia, the free encyclopedia, Oct. 25, 2012; 3 pages, http://en.wikipedia.org/w/index.php?title=Dynannic_Adaptive_Streanning_over_HTTP&oldid=519749189.
Author Unknown, "GStreamer and in-band metadata," from RidgeRun Developer Connection, Jun. 19, 2012, 5 pages https://developersidgerun.conn/wiki/index.php/GStreanner_and_in-band_nnetada.
Author Unknown, "IEEE Standard for the Functional Architecture of Next Generation Service Overlay Networks, IEEE Std. 1903-2011," IEEE, Piscataway, NJ, Oct. 7, 2011; 147 pages.
Author Unknown, "ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.
Author Unknown, "M-PEG 2 Transmission," © Dr. Gorry Fairhurst, 9 pages [Published on or about Jan. 12, 2012] http://www.erg.abdn.ac.uk/future-net/digital-video/mpeg2-trans.html.
Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.
Author Unknown, "Network Functions Virtualisation (NFV); Use Cases," ETSI, GS NFV 001 v1.1.1, Architectural Framework, © European Telecommunications Standards Institute, Oct. 2013, 50 pages.
Author Unknown, "OpenNebula 4.6 User Guide," Jun. 12, 2014, opennebula.org, 87 pages.
Author Unknown, "Understanding Azure, A Guide for Developers," Microsoft Corporation, Copyright © 2016 Microsoft Corporation, 39 pages.
Author Unknown, "3GPP TR 23.803 V7.0.0 (Sep. 2005) Technical Specification: Group Services and System Aspects; Evolution of Policy Control and Charging (Release 7)," 3rd Generation Partnership Project (3GPP), 650 Route des Lucioles—Sophia Antipolis Val bonne—France, Sep. 2005; 30 pages.
Author Unknown, "3GPP TS 23.203 V8.9.0 (Mar. 2010) Technical Specification: Group Services and System Aspects; Policy and Charging Control Architecture (Release 8)," 3rd Generation Partnership Project (3GPP), 650 Route des Lucioles—Sophia Antipolis Val bonne—France, Mar. 2010; 116 pages.
Author Unknown, "3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis Valbonne—France, Dec. 2015, 337 pages.
Author Unknown, "3GPP TS 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9)," 3rd Generation Partnership Project (3GPP), 650 Route des Lucioles—Sophia Antipolis Valbonne—France, Jun. 2010; 259 pages.
Author Unknown, "3GPP TS 29.212 V13.1.0 (Mar. 2015) Technical Specification: 3rd Generation Partnership Project; Technical Specification Group Core Network and Terminals; Policy and Charging Control (PCC); Reference points (Release 13)," 3rd Generation Partnership Project (3GPP), 650 Route des Lucioles—Sophia Antipolis Valbonne—France, Mar. 2015; 230 pages.

(56) References Cited

OTHER PUBLICATIONS

Author Unknown, "Service-Aware Network Architecture Based on SDN, NFV, and Network Intelligence," 2014, 8 pages.
Baird, Andrew, et al. "AWS Serverless Multi-Tier Architectures; Using Amazon API Gateway and AWS Lambda," Amazon Web Services Inc., Nov. 2015, 20 pages.
Bi, Jing, et al., "Dynamic Provisioning Modeling for Virtualized Multi-tier Applications in Cloud Data Center," 2010 IEEE $3^{rd}$ International Conference on Cloud Computing, Jul. 5, 2010, pp. 370-377, IEEE Computer Society.
Bitar, N., et al., "Interface to the Routing System (I2RS) for the Service Chaining: Use Cases and Requirements," draft-bitar-i2rs-service-chaining-01, Feb. 14, 2014, pp. 1-15.
Boucadair, Mohamed, et al., "Differentiated Service Function Chaining Framework," Network Working Group Internet Draft draft-boucadair-network-function-chaining-03, Aug. 21, 2013, 21 pages.
Bremler-Barr, Anat, et al., "Deep Packet Inspection as a Service," CoNEXT '14, Dec. 2-5, 2014, pp. 271-282.
Cisco Systems, Inc. "Cisco NSH Service Chaining Configuration Guide," Jul. 28, 2017, 11 pages.
Cisco Systems, Inc. "Cisco VN-LINK: Virtualization-Aware Networking," 2009, 9 pages.
Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.
Ersue, Mehmet, "ETSI NFV Management and Orchestration—An Overview," Presentation at the IETF# 88 Meeting, Nov. 3, 2013, 14 pages.
Farrel, A., et al., "A Path Computation Element (PCE)—Based Architecture," RFC 4655, Network Working Group, Aug. 2006, 40 pages.
Fayaz, Seyed K., et al., "Efficient Network Reachability Analysis using a Succinct Control Plane Representation," 2016, ratul.org, pp. 1-16.
Halpern, Joel, et al., "Service Function Chaining (SFC) Architecture," Internet Engineering Task Force (IETF), Cisco, Oct. 2015, 32 pages.
Hendrickson, Scott, et al. "Serverless Computation with OpenLambda," Elastic 60, University of Wisconsin, Madison, Jun. 20, 2016, 7 pages, https://www.usenix.org/system/files/conference/hotcloud16/hotcloud16_hendrickson.pdf.
Jiang, Y., et al., "An Architecture of Service Function Chaining," IETF Network Working Group Internet Draft, draft-jiang-sfc-arch-01.txt, Feb. 14, 2014; 12 pages.
Jiang, Yuanlong, et al., "Fault Management in Service Function Chaining," Network Working Group, China Telecom, Oct. 16, 2015, 13 pages.
Katsikas, Goergios P., et al., "Profiling and accelerating commodity NFV service chains with SCC," The Journal of Systems and Software, vol. 127, Jan. 2017, pp. 12-27.
Kumar, Surendra, et al., "Service Function Path Optimization: draft-kumar-sfc-sfp-optimization-00.txt," Internet Engineering Task Force, IETF; Standard Working Draft, May 10, 2014, 14 pages.
Kumbhare, Abhijit, et al., "Opendaylight Service Function Chaining Use-Cases," Oct. 14, 2014, 25 pages.
Li, Hongyu, "Service Function Chaining Use Cases", IETF 88 Vancouver, Nov. 7, 2013, 7 pages.
Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.
Newman, David, "Review: FireEye fights off multi-stage malware," Network World, May 5, 2014, 7 pages.
Nguyen, Kim-Khoa, et al. "Distributed Control Plane Architecture of Next Generation IP Routers," IEEE, 2009, 8 pages.
Penno, Reinaldo, et al. "Packet Generation in Service Function Chains," draft-penno-sfc-packet-03, Apr. 29, 2016, 25 pages.
Penno, Reinaldo, et al. "Services Function Chaining Traceroute," draft-penno-sfc-trace-03, Sep. 30, 2015, 9 pages.
Pierre-Louis, Marc-Arhtur, "OpenWhisk: A quick tech preview," DeveloperWorks Open, IBM, Feb. 22, 2016, modified Mar. 3, 2016, 7 pages; https://developer.ibm.com/open/2016/02/22/openwhisk-a-quick-tech-preview/.
Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.
Quinn, P., et al., "Network Service Header," Network Working Group, Mar. 24, 2015, 42 pages; https://tools.ietf.org/pdf/draft-ietf-sfc-nsh-00.pdf.
Quinn, P., et al., "Network Service Chaining Problem Statement," draft-quinn-nsc-problem-statement-03.txt, Aug. 26, 2013, 18 pages.
Quinn, Paul, et al., "Network Service Header," Network Working Group, draft-quinn-sfc-nsh-02.txt, Feb. 14, 2014, 21 pages.
Quinn, Paul, et al., "Network Service Header," Network Working Group, draft-quinn-nsh-00.txt, Jun. 13, 2013, 20 pages.
Quinn, Paul, et al., "Network Service Header," Network Working Group Internet Draft draft-quinn-nsh-01, Jul. 12, 2013, 20 pages.
Quinn, Paul, et al., "Service Function Chaining (SFC) Architecture," Network Working Group Internet Draft draft-quinn-sfc-arch-05.txt, May 5, 2014, 31 pages.
Quinn, Paul, et al., "Service Function Chaining: Creating a Service Plane via Network Service Headers," IEEE Computer Society, 2014, pp. 38-44.
Wong, Fei, et al., "SMPTE-TT Embedded in ID3 for HTTP Live Streaming, draft-smpte-id3-http-live-streaming-00," Informational Internet Draft, Jun. 2012, 7 pages http://tools.ietf.org/htnnl/draft-snnpte-id3-http-live-streaming-00.
Yadav, Rishi, "What Real Cloud-Native Apps Will Look Like," Crunch Network, posted Aug. 3, 2016, 8 pages; https://techcrunch.com/2016/08/03/what-real-cloud-native-apps-will-look-like/.
Zhang, Ying, et al. "StEERING: A Software-Defined Networking for Inline Service Chaining," IEEE, 2013, IEEE, p. 10 pages.

\* cited by examiner

SYSTEM AND METHOD FOR PROVIDING A BIT INDEXED SERVICE CHAIN

CROSS-REFERENCE TO RELATED APPLICATIONS

This application is a continuation of U.S. Pat. No. 10,225,187 entitled SYSTEM AND METHOD FOR PROVIDING A BIT INDEXED SERVICE CHAIN, filed on Mar. 22, 2017, which is expressly incorporated by reference in its entirety.

TECHNICAL FIELD

The present disclosure relates to service chaining and more particularly to an approach of enabling a single packet to visit sequentially multiple destinations before reaching its final destination.

BACKGROUND

Service chaining is a networking concept that allows for a single packet to visit sequentially multiple destinations before reaching its final destination. The method is often used for security purposes (firewall, parental control, load-balancing) but can also be used in content delivery networks for visiting different levels of caches, which can be called content hunting. It can be achieved at layer 2 using NSH or MPLS segment routing, or at layer 3 using IPv6 segment routing.

With IPv6, the destinations are encoded as a list of IPv6 destinations which are sequentially visited before reaching the final destination or, in the case of content hunting, before one of the intermediate destinations intercepts the request and serves the content. But using 128 bits per visited node is not practical when the list of destinations grows.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The scheme proposed addresses the issues raised above by using Bit Indexed Explicit Replication (BIER) headers but instead of replicating the packets and delivering it to all destinations in parallel, the invention delivers the packets in series. The scheme provides a flexible way to provide sequential delivery of the packet while keeping the header overhead small. Although it seems very different from multicast, the proposed approach is compatible with the BIER algorithm and can extend the BIER routing behavior.

In one example aspect, a method includes receiving a packet at a node, wherein the packet comprises a bit indexed explicit replication (BIER) header identifying a bitstring, the bitstring including a first bit indicating a first destination and a second bit indicating a second destination, the first bit and the second bit corresponding to respective bit positions associated with the first destination and the second destination, and forwarding the packet through one or more networks toward the first destination and the second destination based on the bitstring and a predetermined bit selection order, wherein the predetermined bit selection order and the bitstring yield a sequential delivery of the packet to the first destination and the second destination. After the packet arrives at the first destination, the method includes setting the first bit to zero in the bitstring to yield an updated bitstring and forwarding the packet through the one or more networks toward the second destination according to the updated bitstring and the predetermined bit selection order.

DETAILED DESCRIPTION

The present disclosure addresses the issues raised above. The disclosure provides a system, method and computer-readable storage device embodiments. First a general example system shall be disclosed in FIG. 1 which can provide some basic hardware components making up a server, node or other computer system.

Figure 1:
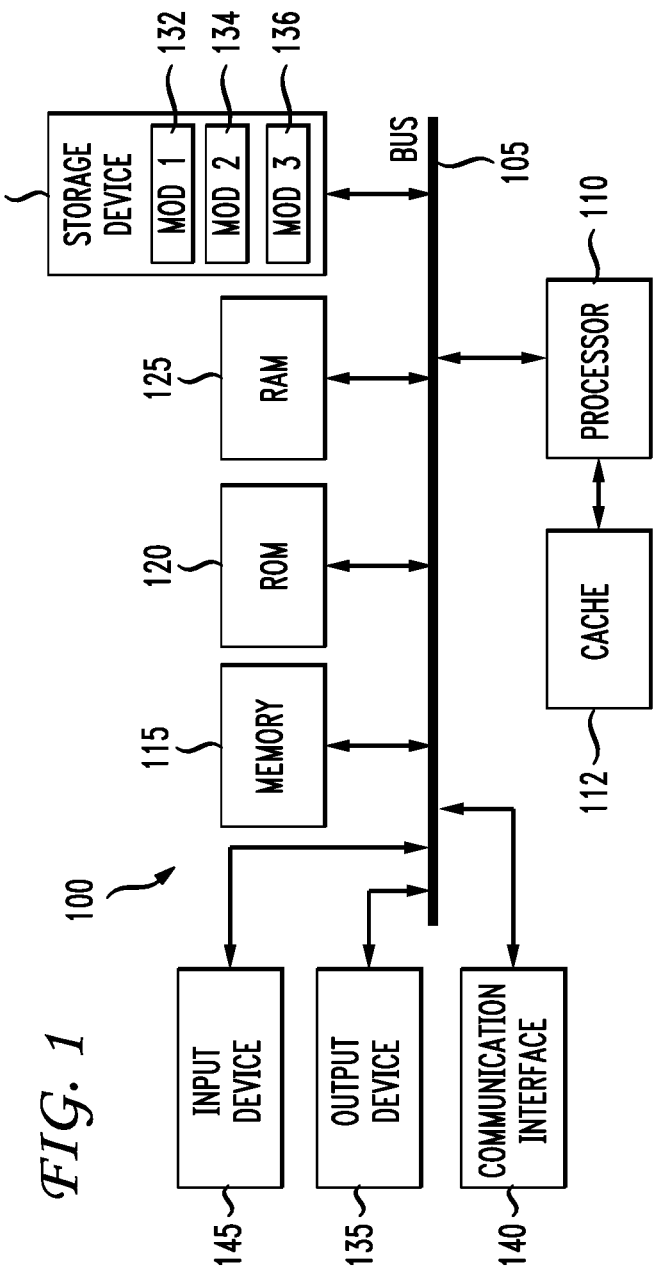
FIG. 1 illustrates an example system configuration.

FIG. 1 illustrates a computing system architecture 100 wherein the components of the system are in electrical communication with each other using a bus 105. Exemplary system 100 includes a processing unit (CPU or processor) 110 and a system bus 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware module or software module, such as module 1 132, module 2 134, and module 3 136 stored in storage device 130, configured to control the processor 110 as well as a special-purpose processor where software instructions are incorporated into the actual processor design. The processor 110 may essentially be a completely self-contained computing system, containing multiple cores or processors, a bus, memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software modules 132, 134, 136 for controlling the processor 110. Other hardware or software modules are contemplated. The storage device 130 can be connected to the system bus 105. In one aspect, a hardware module that performs a particular function can include the software component stored in a computer-readable medium in connection with the necessary hardware components, such as the processor 110, bus 105, display 135, and so forth, to carry out the function.

Figure 2:
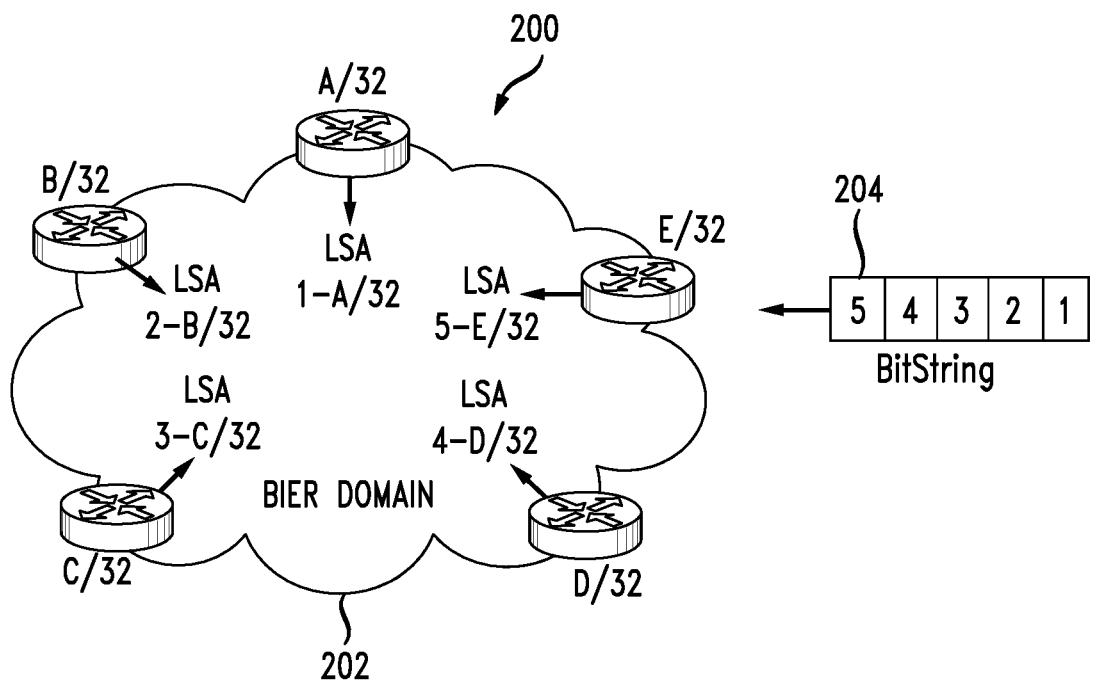
FIG. 2 illustrates a basic bit indexed explicit replication (BIER) environment.

Having introduced the basic computing components which can be applicable to embodiments associated with this disclosure, the disclosure now turn to the specific details of the improvements disclosed herein. The disclosure provides an improvement to service chaining using a unique implementation of bit indexed explicit replication (BIER) headers and routing strategies. The BIER protocol is an architecture for the forwarding of multicast data packets. It provides forwarding of multicast data packets through a "multicast domain". One of skill in the art will understand the basic approach to BIER and how the approach is modified according to the concepts disclosed herein. FIG. 2 illustrates an example network 200 with a BIER domain 202. However, the network 200 and/or BIER domain 202 do not require the use of a protocol for explicitly building multicast distribution trees, or intermediate nodes to maintain any per-flow state.

A router that supports BIER is known as a "Bit-Forwarding Router" (BFR). FIG. 2 shows several BFRs A/32, B/32, C/32, D/32 and E/32. The BIER control plane protocols run within the "BIER domain" 202, allowing the BFRs within that domain to exchange the information needed for them to forward packets to each other using BIER. The BIER algorithm assigns a unique bit position from a bitstring 204 to each BFR in the domain 202. Each BFR floods their bit position to BFR-prefix mapping using the internet gateway protocol (IGP) (Open Shortest Path First (OSPF), Intermediate System to Intermediate System (ISIS)).

A multicast data packet enters a BIER domain at a "Bit-Forwarding Ingress Router" (BFIR), and leaves the BIER domain at one or more "Bit-Forwarding Egress Routers" (BFERs). A BFR that receives a multicast data packet from another BFR in the same BIER domain, and forwards the packet to another BFR in the same BIER domain, will be known as a "transit BFR" for that packet. A single BFR may be a BFIR for some multicast traffic while also being a BFER for some multicast traffic and a transit BFR for some multicast traffic. In fact, a BFR may be the BFIR for a given packet and may also be (one of) the BFER(s), for that packet; it may also forward that packet to one or more additional BFRs.

A BIER domain may contain one or more sub-domains. Each BIER domain must contain at least one sub-domain, the "default sub-domain" (also denoted "sub-domain zero"). If a BIER domain contains more than one sub-domain, each BFR in the domain must be provisioned to know the set of sub-domains to which it belongs. Each sub-domain is identified by a sub-domain-id in the range [0,255].

For each sub-domain to which a given BFR belongs, if the BFR is capable of acting as a BFIR or a BFER, it must be provisioned with a "BFR-id" that is unique within the sub-domain. A BFR-id is a small unstructured positive integer. For instance, if a particular BIER sub-domain contains 1,374 BFRs, each one could be given a BFR-id in the range 1-1374.

If a given BFR belongs to more than one sub-domain, it may (though it need not) have a different BFR-id for each sub-domain. When a multicast packet arrives from outside the domain at a BFIR, the BFIR determines the set of BFERs to which the packet will be sent. The BFIR also determines the sub-domain in which the packet will be sent. Determining the sub-domain in which a given packet will be sent is known as "assigning the packet to a sub-domain".

Procedures for choosing the sub-domain to which a particular packet is assigned are outside the scope of this application. However, once a particular packet has been assigned to a particular sub-domain, it remains assigned to that sub-domain until it leaves the BIER domain.

That is, the sub-domain to which a packet is assigned must not be changed while the packet is in flight through the BIER domain. Once the BFIR determines sub-domain and the set of BFERs for a given packet, the BFIR encapsulates the packet in a "BIER header". The BIER header contains a bitstring in which each bit represents a single BFR-id. To indicate that a particular BFER is to receive a given packet, the BFIR sets the bit corresponding to that BFER's BFR-id in the sub-domain to which the packet has been assigned. The term "BitString" can be used to refer to the bitstring field in the BIER header. The term "payload" can refer to the packet that has been encapsulated. Thus a "BIER-encapsulated" packet consists of a "BIER header" followed by a "payload".

The number of BFERs to which a given packet can be forwarded is limited only by the length of the BitString in the BIER header. Different deployments can use different BitString lengths. The term "BitStringLength" can refer to the number of bits in the BitString. It is possible that some deployments will have more BFERs in a given sub-domain than there are bits in the BitString. To accommodate this case, the BIER encapsulation includes both the BitString and a "Set Identifier" (SI). It is the BitString and the SI together that determine the set of BFERs to which a given packet will be delivered. While the traditional BIER algorithm replicates packets, and thus provides parallels forwarding of packets to various destinations, the present disclosure provides an approach to enable sequential processing of packets.

By convention, the least significant (rightmost) bit in the BitString is "bit 1", and the most significant (leftmost) bit is "bit BitStringLength". If a BIER-encapsulated packet has an SI of n, and a BitString with bit k set, then the packet must be delivered to the BFER whose BFR-id (in the sub-domain to which the packet has been assigned) is n*BitStringLength+k.

For example, suppose the BIER encapsulation uses a BitStringLength of 256 bits. By convention, the least significant (rightmost) bit is "bit 1", and the most significant (leftmost) bit is "bit 256". Suppose that a given packet has been assigned to sub-domain 0, and needs to be delivered to three BFERs, where those BFERs have BFR-ids in sub-domain 0 of 13, 126, and 235 respectively. The BFIR would create a BIER encapsulation with the SI set to zero, and with bits 13, 126, and 235 of the BitString set. (All other bits of the BitString would be clear.) If the packet also needs to be sent to a BFER whose BFR-id is 257, the BFIR would have to create a second copy of the packet, and the BIER encapsulation would specify an SI of 1, and a BitString with bit 1 set and all the other bits clear.

Note that it is generally advantageous to assign the BFR-ids of a given sub-domain so that as many BFERs as possible can be represented in a single bitstring.

Suppose a BFR, call it BFR-1 204 receives a packet whose BIER encapsulation specifies an SI of 0, and a BitString with bits 13, 26, and 235 set. Suppose BFR-1 204 has two BFR neighbors, BFR-2 206 and BFR-3 212, such that the best path to BFER 13 (208) and BFER 26 (210) is via BFR-2, but the best path to BFER 235 is via BFR-C. Then BFR-A will replicate the packet, sending one copy to BFR-2 (206) and one copy to BFR-c (212). However, BFR-1 (204) will clear bit 235 in the BitString of the packet copy it sends to BFR-2 (206), and will clear bits 13 and 26 in the BitString of the packet copy it sends to BFR-3 (212). As a result, BFR-2 (206) will forward the packet only towards BFERs 13 (208) and 26 (210), and BFR-3 (212) will forward the packet only towards BFER 235 (214). This ensures that each BFER receives only one copy of the packet.

With this forwarding procedure, a multicast data packet can follow an optimal path from its BFIR 202 to each of its BFERs 208, 210, 214. Further, since the set of BFERs for a given packet is explicitly encoded into the BIER header, the packet is not sent to any BFER that does not need to receive it. This allows for optimal forwarding of multicast traffic.

This optimal forwarding is achieved without any need for transit BFRs to maintain per-flow state, or to run a multicast tree-building protocol.

The idea of encoding the set of egress nodes into the header of a multicast packet is not new. For example, researchers have proposed to encode the set of egress nodes as a set of IP addresses, and propose mechanisms and procedures that are in some ways similar to those described in the current document. However, since BIER encodes each BFR-id as a single bit in a bitstring, it can represent up to 128 BFERs in the same number of bits that it would take to carry the IPv6 address of a single BFER. Thus BIER scales to a much larger number of egress nodes per packet.

BIER does not require that each transit BFR look up the best path to each BFER that is identified in the BIER header; the number of lookups required in the forwarding path for a single packet can be limited to the number of neighboring BFRs; this can be much smaller than the number of BFRs.

The BFR Identifier and BFR-Prefix are discussed next. Each BFR must be assigned a "BFR-Prefix". A BFR's BFR-Prefix can be an IP address (either IPv4 or IPv6) of the BFR, and can be unique and routable within the BIER domain. It is recommended that the BFR-prefix be a loopback address of the BFR. Two BFRs in the same BIER domain may not be assigned the same BFR-Prefix. Note that a BFR in a given BIER domain can have the same BFR-prefix in all the sub-domains of that BIER domain.

A "BFR Identifier" (BFR-id) is a number in the range [1,65535]. In general, each BFR in a given BIER sub-domain can be assigned a unique number from this range (i.e., two BFRs in the same BIER sub-domain may not have the same BFR-id in that sub-domain). However, if it is known that a given BFR will never need to function as a BFER or BFIR in a given sub-domain, then it is not necessary to assign a BFR-id for that sub-domain to that BFR.

Note that the value 0 is not a legal BFR-id. The procedure for assigning a particular BFR-id to a particular BFR is outside the scope of this specification. However, it is recommended that the BFR-ids for each sub-domain be assigned "densely" from the numbering space, as this will result in a more efficient encoding. That is, if there are 256 or fewer BFERs, it is recommended to assign all the BFR-ids from the range [1,256]. If there are more than 256 BFERs, but less than 512, it is recommended to assign all the BFR-ids from the range [1,512], with as few "holes" as possible in the earlier range.

In general the BIER algorithm can be described as an alternative method of multicast forwarding. The algorithm does not require any multicast-specific trees, and hence does not require any multicast-specific tree building protocols. Within a given "BIER domain", an ingress node encapsulates a multicast data packet in a "BIER header". The BIER header identifies the packet's egress nodes in that domain. Each possible egress node is represented by a single bit within a bitstring. To send a packet to a particular set of egress nodes, the ingress node sets the bits for each of those egress nodes, and clears the other bits in the bistring. Each packet can then be forwarded along the unicast shortest path tree from the ingress node to the egress nodes. Thus there are no per-flow forwarding entries.

Figure 3:
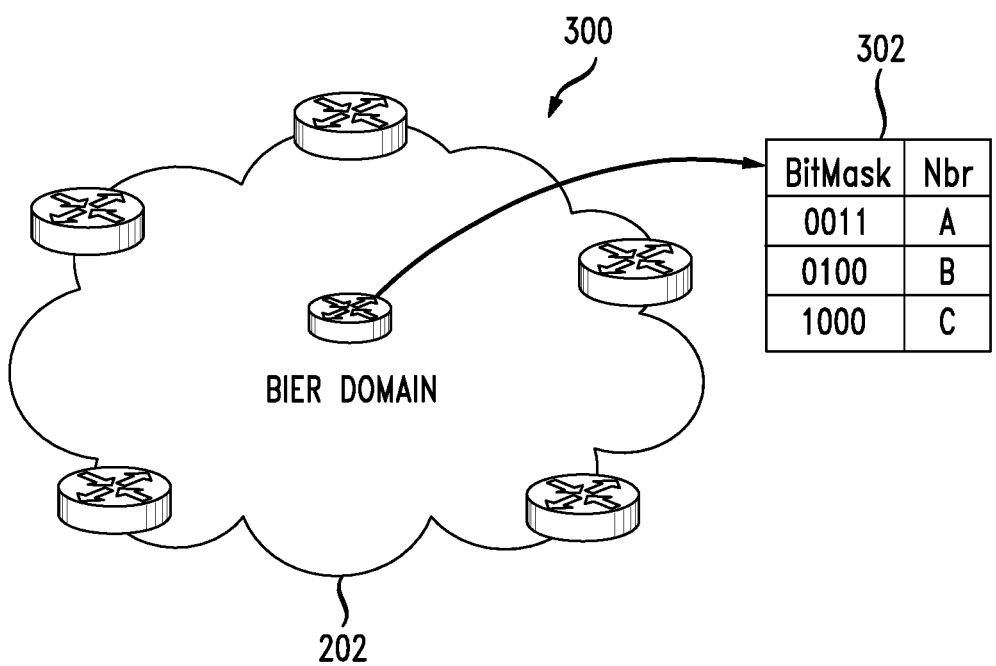
FIG. 3 further illustrates the basic idea of the BIER algorithm.

FIG. 3 Illustrates further the basic idea of the BIER algorithm 300 with a bit forwarding table 302. A router will have a bit forwarding table 302 which includes bit mask entries as well as a listing of non-backbone routers in the particular BIER domain 202. The algorithm assigns a unique bit position from a mask to each edge router in the domain 202. Each edge router floods their bit position-to-ID mapping with a new LSA-OSPF or ISIS. All BFR's use unicast routing information base (RIB) to identify the best path for each BFR-prefix. Bit positions are OR'd together to form a bit mask per BFR-router. The packets are forwarded and replicated hop by hop using the bit forwarding table.

Figure 4:
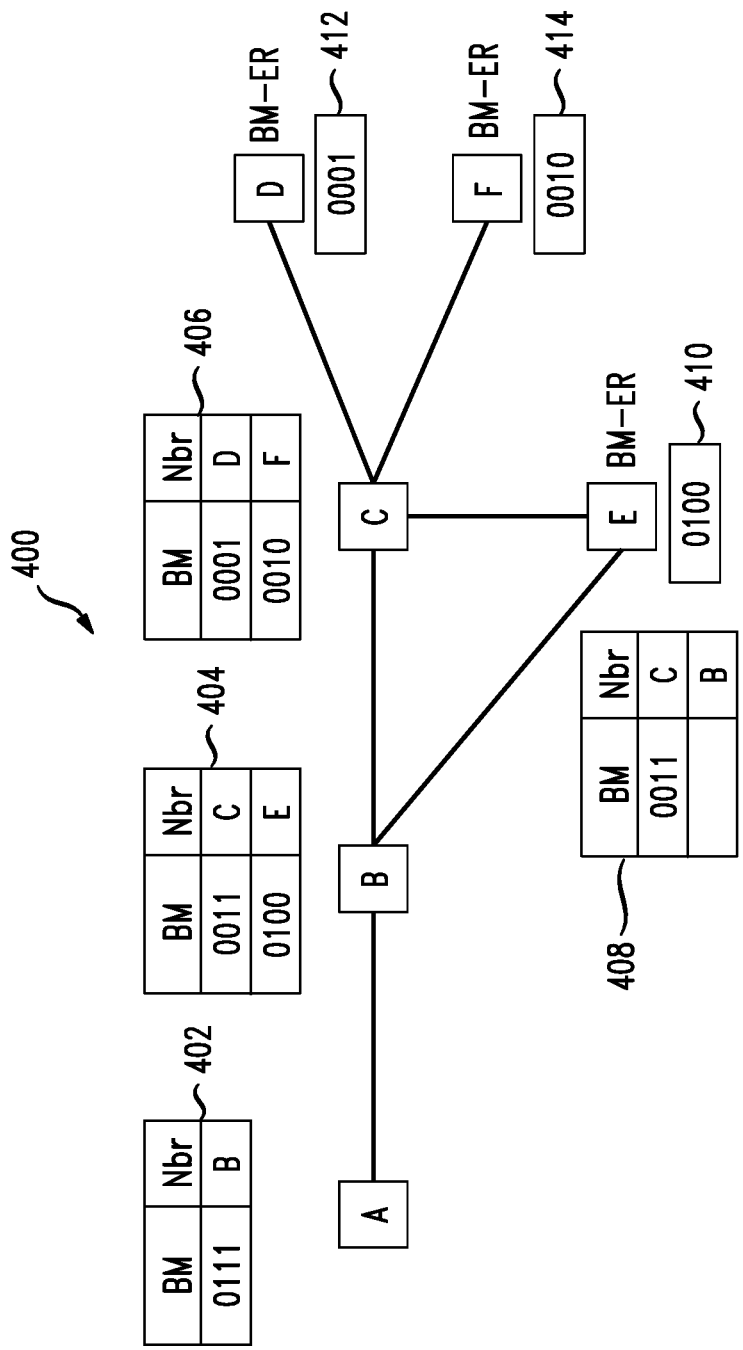
FIG. 4 illustrates a bit index forwarding table.

FIG. 4 illustrates the principles further. In the network 400, router A includes its bit forwarding table 402, router B has its forwarding table 404, router C includes its forwarding table 406, router E includes its bit forwarding table 408 and its ID (0100) 410, router D includes its ID(0001) 412 and router F includes its ID (0010) 414. Notes that many of the bit forwarding tables include the next router. For example, bit forwarding table 402 associated with router A references the next destination router B. Routers D, F and E advertise their bit positions in the IGP. Routers A, B and C no the mapping between the bit and the RID. Based on the shortest path to a respective RID, the bit mask forwarding table is created for each router.

Figure 5:
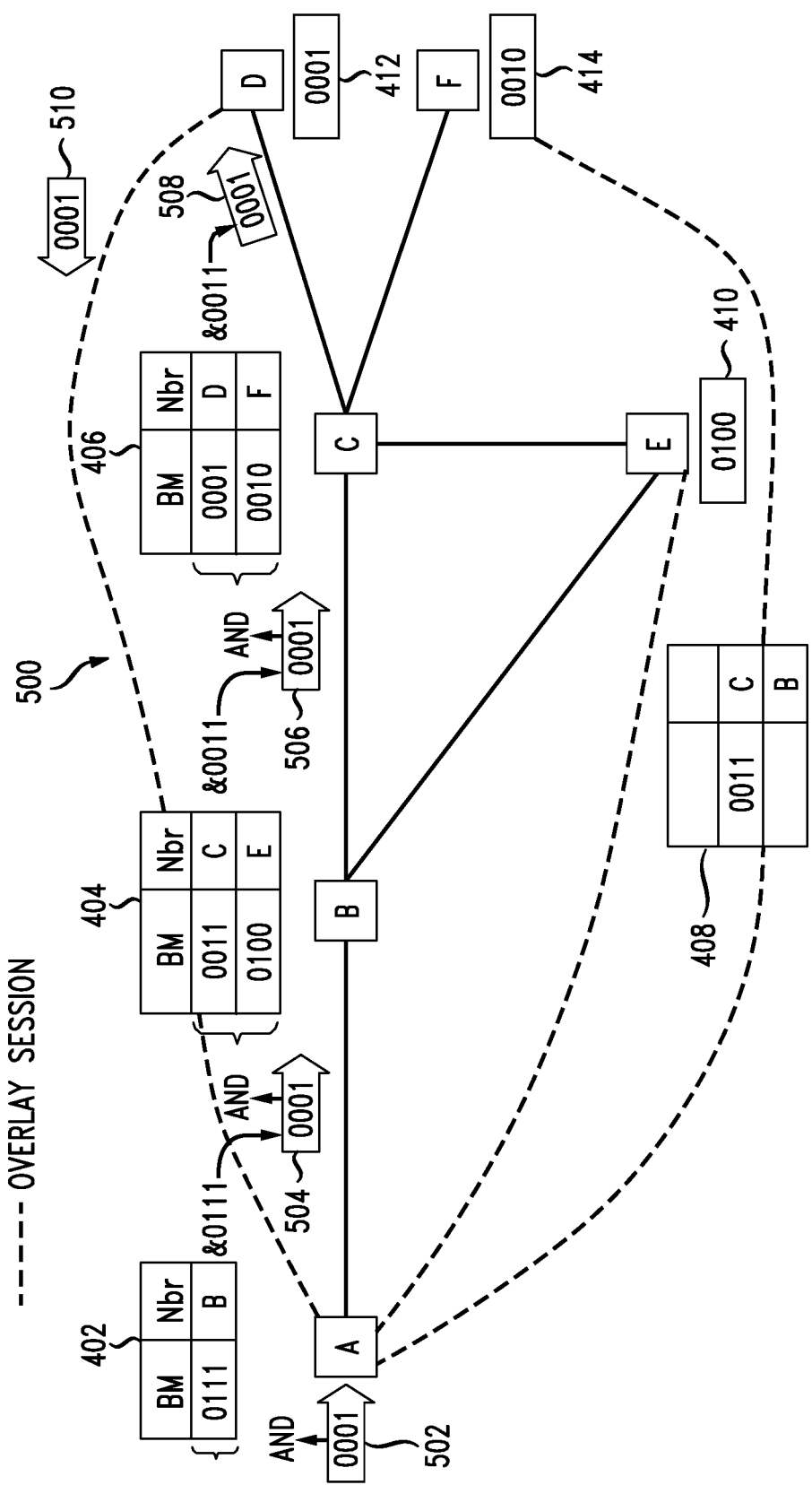
FIG. 5 illustrates forwarding packets using the BIER algorithm.

FIG. 5 illustrates the approach 500 for a particular packet. Assume a packet has an associated bitstring 502 with the bits "0001". This represents the destination router is routed the as its ID is also 0001 412. The algorithm includes AND'ing the bitstring 50 with the entry in the bit forwarding table 402 of 0111 to yield bitstring 503 (0001). Bitstring 504 is AND'ed with the entries in bit forwarding table 404 (0011, 0100) to yield bitstring 506 (0001). This resulting bitstring is AND'd with the strings in bit forwarding table 406 (0001, 0010) to yield bitstring 508 (0001) which arrives at its destination of router D with its corresponding ID 412 (0001). A confirmation or other communication 510 confirming receipt of the packet can be provided through an overlay session from router D.

Figure 6:
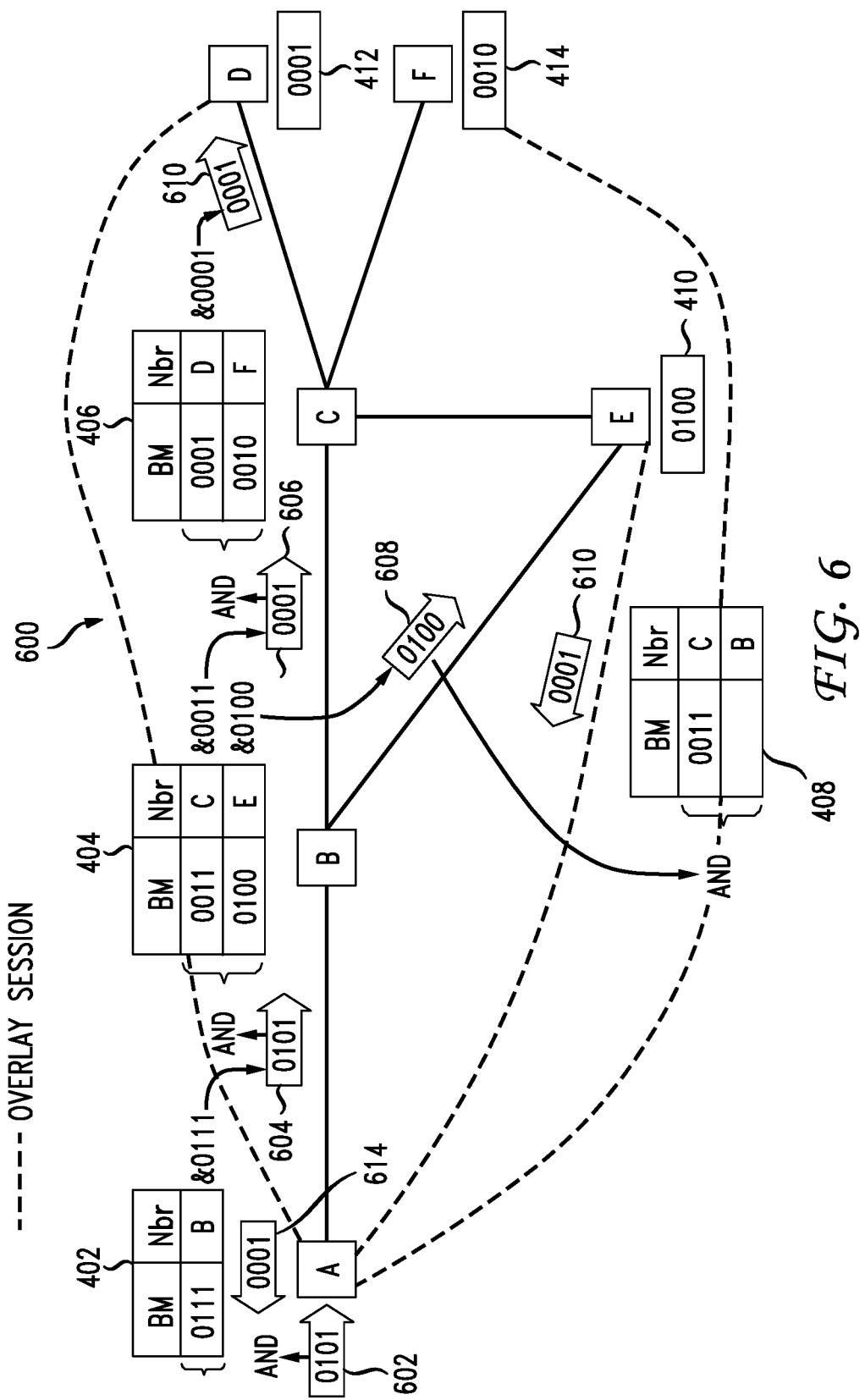
FIG. 6 illustrates forwarding packets using the BIER algorithm.

FIG. 6 illustrates the approach 600 in which the bitstring 602 is "0101" thus indicating that the associated packet has two destinations. One destination is router D (0001) in the other destination is router E (0100) 410. Note that AND'ing the bitstring 602 with the bitmap in table 402 results in its string 604 (0101) and that AND'ing that bitstring with the bitmaps in table 404 results in two bitstrings 606 (0001) and 608 (0100). The packet in this scenario is replicated such that a first copy of the packet is forwarded to router D through router C and a second copy of the packet is forwarded to router E. Feedback 614 is provided to confirm receipt of the packet from router D and feedback 612 confirms receipt of the packet at router E.

Figure 7:
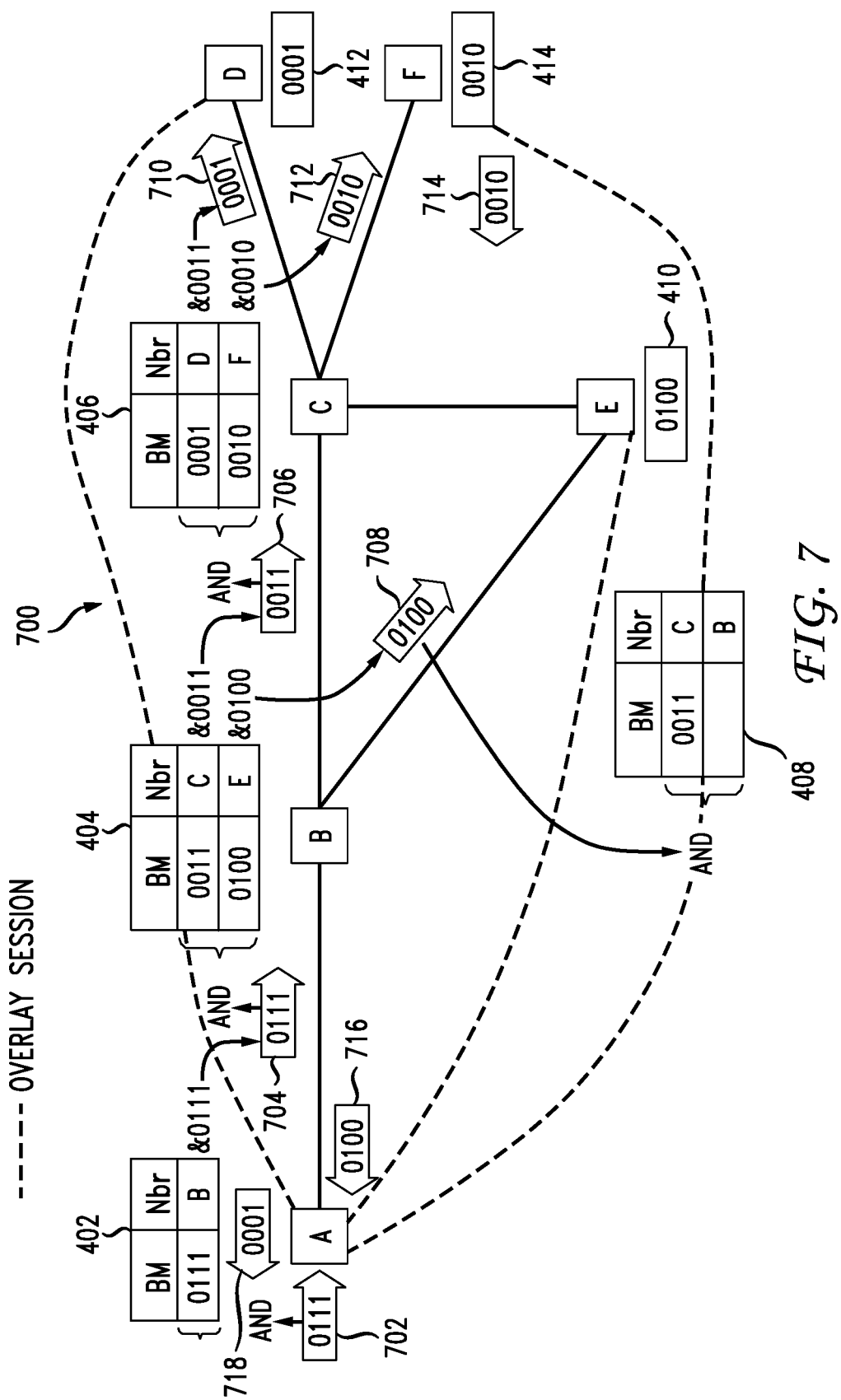
FIG. 7 illustrates forwarding packets using the BIER algorithm.

FIG. 7 illustrates yet another scenario 700 in which the bitstring 702 is "0111" indicates three destinations, router D, router E and router F. As the bitstring 702 is processed from node to node, packet string 704 turns into packet strings 706 and 708, thus replicating the packet as it is forwarded to routers C and E. From router C, the packet string is further replicated into packet string 710 (0001) for delivery to router D and 712 (0010) as a replicated packet for delivery to router F. Confirmation feedback 714 from router F, feedback 716 from router E and feedback 718 from router D can be provided.

As illustrated above, the BIER algorithm uses the unicast routing table in order to replicate packets according to its destinations, which are encoded as bits in a bit mask with each bit set to one to indicate a desire destination. As further described below, BIER can also be modified to provide sequential delivery of a packet. Similar to the BIER implementations described above, the bits in the bitmap can be switched from 1 to 0 as the packet travels. However, the BIER implementation can be further modified to only set a bit to zero when it reaches the destination owning that particular bit. Conceptually, this operation can provide BIER replication between local delivery and next-destination forwarding, but the packet is not necessarily replicated on the wires.

Figure 8:
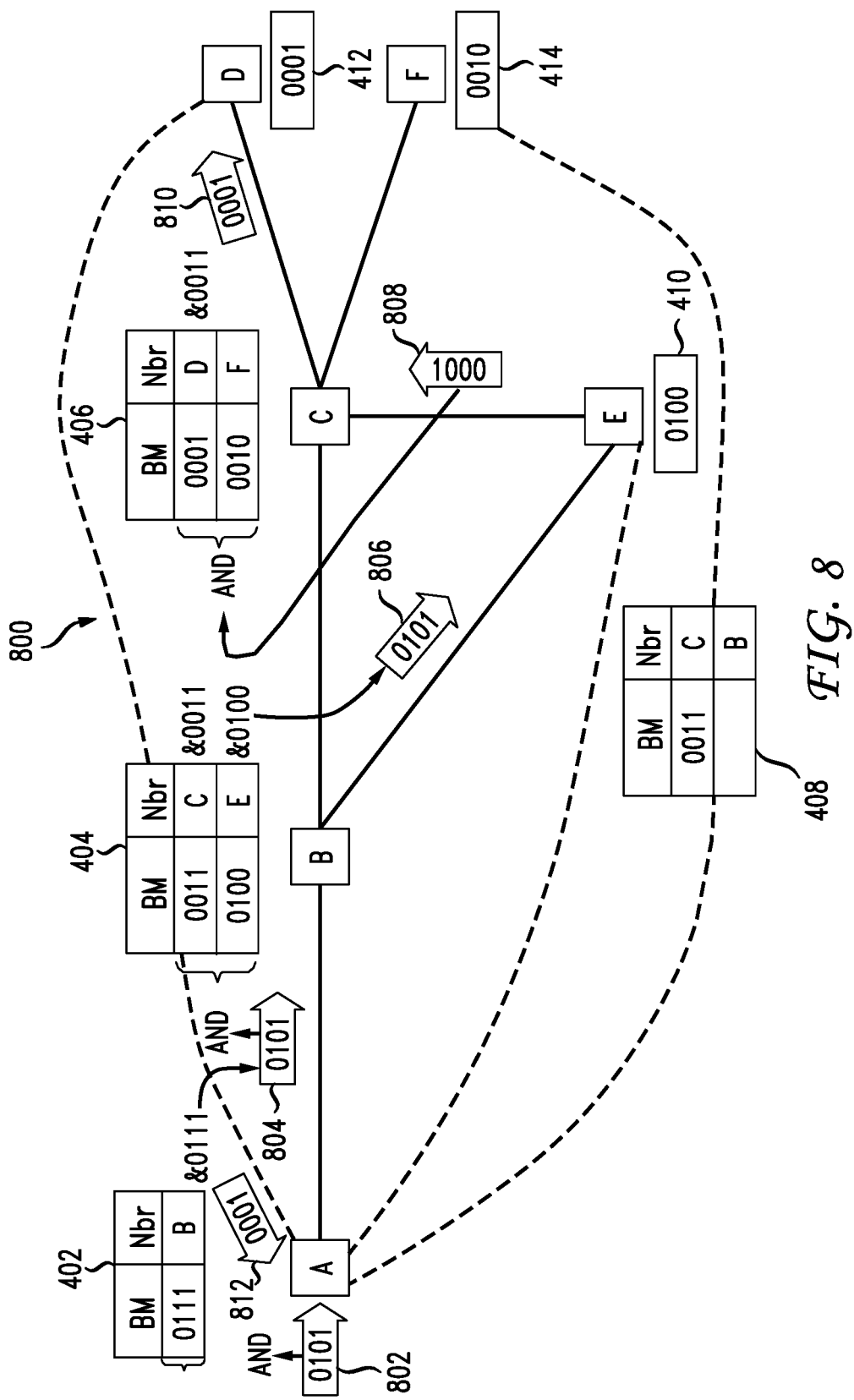
FIG. 8 illustrates porting packets according to the principles disclosed herein.

FIG. 8 illustrates an example approach for service chaining using BIER. Assume a bitstring of "0101" 802 which thus indicates that one destination router is router D and other destination router is router E. In order to avoid loops, nodes must agree, given a bit mask, on the next destination. The packet associated with bitstring 802 is therefore forwarded towards a chosen destination first. When the destination is reached, the packet sets its own bit to 0, and the destination node forwards the packet further to the next destination, or stops if it is the last destination. In this example router E, will be chosen as the first destination and thus the first bit in the bitstring 0101 will represent the first destination in the sequence, followed by router D which is identified by the second bit.

Node A can receive the packet associated with bitstring 802 which includes a first bit indicating a first destination is router E and a second bit indicating a second destination is router D. The bitstring is therefore "0101" 802. According to the principles disclosed herein, the node or the system could select the first bit as indicating the first destination and then forward the packet through the network 800 to the first destinations (router E) according to the bit indexed explicit replication algorithm but also based on a forwarding bit mask (which is shown associated with the various nodes A, B, etc.) and the first bit in the bitstring. Note that in FIG. 8, the packet is not replicated, in one aspect, leaving router B. By AND'ing the bistring 802 with the data (0111) in the forwarding table 402, the resulting bitstring 804 is 0101. AND'ing the bitstring 0101 (804) with the data in the forwarding table 404 (0011 and 0100), the result is bitstring 806 (0101). After the packet arrives at the first destination, router E in this example, the first bit is set to zero in the bitstring yielding the bistring 0001 (808) leaving router E en route to router C. The packet 808 is AND'ed with the forwarding table data (0001 and 0010) from table 406 to yield bitstring 810 which is 0001. Packet 810 is sequentially forwarded to the second destination (router D with identification 0001) through the network 800 according to the bit indexed explicit replication algorithm and based on the second bit in the bitstring. At router D, the "1" in the bitstring 0001 can be set to zero indicating a successful arrival at the router D. A confirmation can be transmitted 812 to router A that the sequential delivery of the packet has been successful.

According to the principles disclosed herein, the order of sequential delivery of the packet can be any chosen order. For example, if the bitstring is 01010111, there are five 1's in the bitstring. Each "1" represents a destination node and the order of sequential delivery of the bitstring can be any chosen order. In the example in FIG. 8, the first chosen "1" represented the first node to which the packet is to be delivered and the second "1" in the bitstring represented the final destination node. The order of course could be reversed or could be a random order. In the bitstring above (01010111), the third "1" could be the first destination, the first "1" to be chosen as the second destination, the fifth "1" could be the third destination, the second "1" to be the fourth destination and the fourth "1" could identify the last destination.

There are number of possible algorithms to achieve this desired result. One approach includes picking the first bit set to 1 as the destination. This way, destinations will be visited in bit order and bits will be set to zero as those destinations are reached. Another possible algorithm is that any other common order could be used, such as picking the last bit, or in entropy-based pseudo-order which could provide some load-balancing. Yet another alternative is to set the packet to the closest destination among the bits set to 1. Such an approach does not loop as the distance the destination diminishes at each hop.

The concept can be generalized as a combination of the BIER replication and sequential delivery. However, the algorithm disclosed herein should fulfill the following rules in order to avoid loops. First, a node may replicated packet into multiple packets at any time and according to any scheme (e.g., BIER uses shortest path approach according to the RIB). But all the bits set to 1 in one of the created bit masks must be a bit set to 1 in the original packet bit mask. And all bits set to 1 in a created bit mask must be set to 0 in all other created bit masks. Further, another rule can be applied. The algorithm can make sure the packet sent to its next hop never loops with its bit mask unmodified. Note that once the bit mask is modified, the packet may come back to a node already visited.

The present disclosure extends BIER in order to provide sequential delivery of packets and therefore enables chaining of services in a fixed or arbitrary order. The set of destinations are encoded as bits in the packet header. Various algorithms can be used in order to determine the next destination from a set of bits, including in-order, shortest path, or pseudorandom algorithms which can aid in load-balancing. The techniques disclosed herein, when combined with classical BIER, can be seen as a more generic form of the BIER algorithm enabling both parallel and sequential processing.

Several advantages to this disclosure include that the header can be compressed compared to existing service chaining or content hunting technologies, and the algorithm can perform more than in-order sequential delivery, such as shortest path, load-balancing, and so forth. The algorithm can also be combined with BIER to perform parallel and sequential delivery of packets at the same time.

In another aspect, the process can be performed at each individual node C, D, E or F. At each respective node, the node evaluates the bitstring to look for a bit identifying a next destination in the bitstring (e.g. first bit, last bit, random or in some other order). Thus, at node E (node 0100), the node evaluates the bitstring 0101 to identify the next destination. If the order is first bit first, then the next destination node would be itself (0100). If the bit (0100) identifies the node itself, the node clears the bit and repeats the procedure. By clearing bit 0100, the remaining bit in the bitstring would be 0001. The packet is then sent to node D (0001) according to the bitstring. Otherwise, the node looks for the entry in the forwarding table that contains this bit, and forwards the packet on the corresponding interface.

Figure 9:
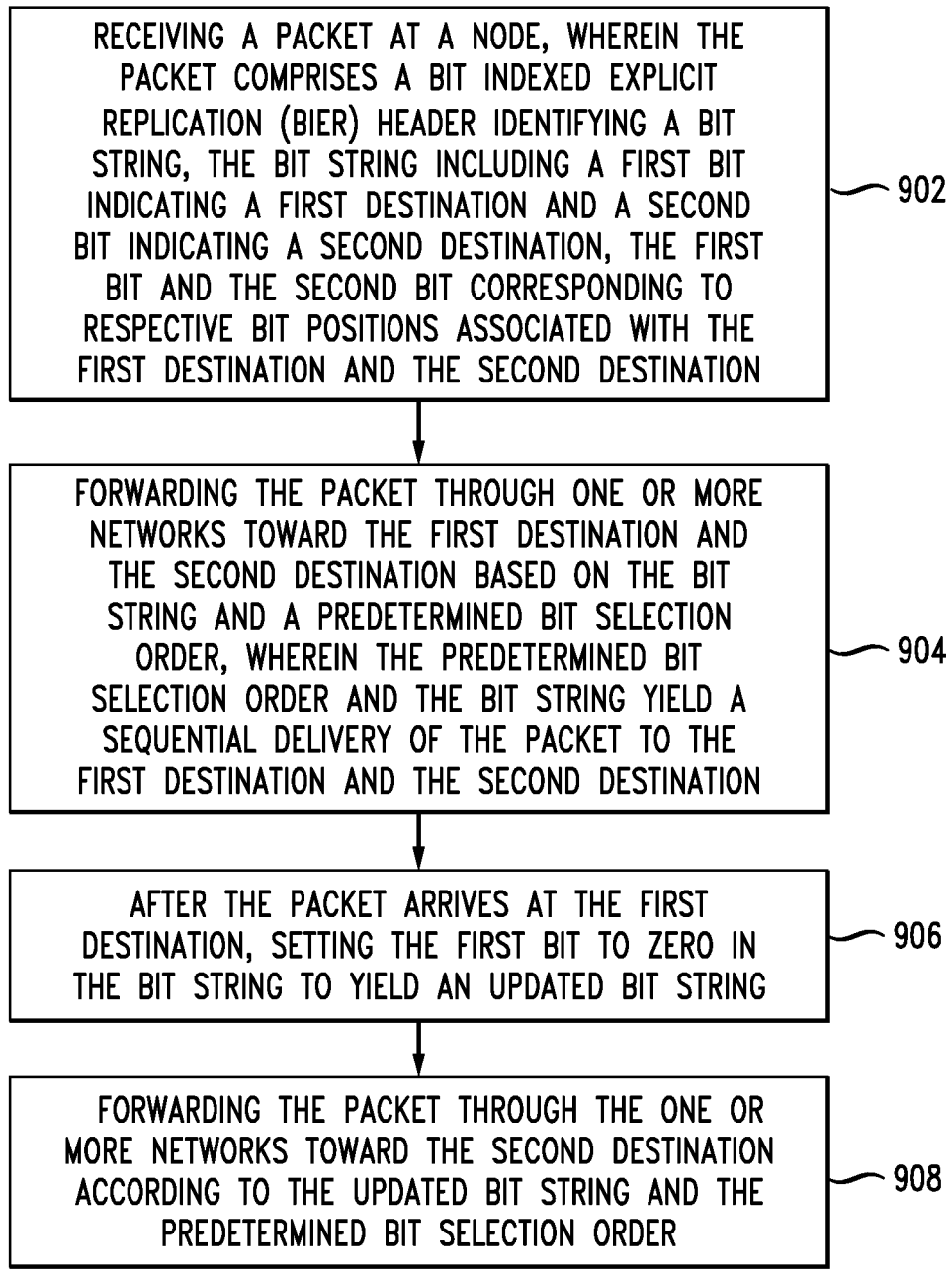
FIG. 9 illustrates a method embodiment.

FIG. 9 illustrates a method embodiment. The method includes receiving a packet at a node, wherein the packet comprises a bit indexed explicit replication (BIER) header identifying a bitstring, the bitstring including a first bit indicating a first destination and a second bit indicating a second destination, the first bit and the second bit corresponding to respective bit positions associated with the first destination and the second destination (902), and forwarding the packet through one or more networks toward the first destination and the second destination based on the bitstring and a predetermined bit selection order, wherein the predetermined bit selection order and the bitstring yield a sequential delivery of the packet to the first destination and the second destination (904). After the packet arrives at the first destination, the method includes setting the first bit to zero in the bitstring to yield an updated bitstring (906) and forwarding the packet through the one or more networks toward the second destination according to the updated bitstring and the predetermined bit selection order (908).

In one aspect, there is no limit to the number of destinations possible. The method can include, after forwarding the packet to the second destination according to the updated bitstring, forwarding the packet through the one or more networks towards a third destination according to a further updated bitstring. The packet could then be forwarded to a fourth destination based on yet a further updated bitstring, and so on.

In one aspect, the predetermined bit selection order is based on a bit operation, which can include one of find first set, count trailing zeros, or number of trailing zeros. Selecting the first bit can include selecting a destination bit in the bitstring according to an entropy-based pseudo order. Selecting the first bit can also include selecting a destination bit in the bitstring based on load-balancing. In another aspect, forwarding the packet can include applying a bitwise AND operation only when it arrives at a destination node, wherein the bitwise AND operation is based on a respective bitmask of the destination node. This is one approach to setting the destination bit to zero upon arrival at the destination. Other approaches can be used as well.

The bit operation can be based on one of an in-order scheme, a shortest path scheme, or a pseudo-random scheme. In another aspect, the method can include forwarding the packet to the network in parallel according to the bit indexed explicit replication algorithm.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A method comprising:
   receiving a packet at a node, wherein the packet includes a bitstring having a plurality of bits each of which indicates a destination;
   ANDing, in response to the receiving, the bitstring of the packet with a bitstring from the node to yield a new bitstring, the new bitstring comprising at least a first bit indicating a first destination and a second bit indicating a second destination;
   first forwarding the packet toward the first destination and the second destination based on the new bitstring such that packet is delivered to the first destination before the second destination;
   after the packet arrives at the first destination, changing the new bitstring to yield an updated bitstring;
   ANDing, in response to the packet arriving at the first destination, the bitstring of the packet with a bitstring from the first destination to yield a new updated bitstring; and
   second forwarding the packet toward the second destination according to the new updated bitstring.

2. The method of claim 1, wherein the first forwarding is also based on predetermined bit selection order that is based on a bit operation.

3. The method of claim 2, wherein the bit operation comprises one of find first set, count trailing zeros, or number of trailing zeros.

4. The method of claim 2, wherein the bit operation is based on an in-order.

5. The method of claim 2, wherein the bit operation is based on a shortest path scheme.

6. The method of claim 2, wherein the bit operation is based on a pseudo-random scheme.

7. The method of claim 1, further comprising third forwarding the packet in parallel according to a bit indexed explicit replication algorithm.

8. A system comprising:
   at least one processor; and
   a computer-readable memory storing instructions which, when executed by the at least one processor, cause the at least one processor to perform operations comprising:
   receiving a packet at a node, wherein the packet includes a bitstring having a plurality of bits each of which indicates a destination;
   ANDing, in response to the receiving, the bitstring of the packet with a bitstring from the node to yield a new bitstring, the new bitstring comprising at least a first bit indicating a first destination and a second bit indicating a second destination;
   first forwarding the packet toward the first destination and the second destination based on the new bitstring such that packet is delivered to the first destination before the second destination;
   after the packet arrives at the first destination, changing the new bitstring to yield an updated bitstring;
   ANDing, in response to the packet arriving at the first destination, the bitstring of the packet with a bitstring from the first destination to yield a new updated bitstring; and
   second forwarding the packet toward the second destination according to the new updated bitstring.

9. The system of claim 8, wherein the first forwarding is also based on predetermined bit selection order that is based on a bit operation.

10. The system of claim 9, wherein the bit operation comprises one of find first set, count trailing zeros, or number of trailing zeros.

11. The system of claim 9, wherein the bit operation is based on an in-order scheme.

12. The system of claim 9, wherein the bit operation is based on a shortest path scheme.

13. The system of claim 9, wherein the bit operation is based on a pseudo-random scheme.

14. The system of claim 8, the operations further comprising third forwarding the packet in parallel according to a bit indexed explicit replication algorithm.

15. A non-transitory computer-readable media storing instructions which, when executed by at least one processor, cause the at least one processor to perform operations comprising:

- receiving a packet at a node, wherein the packet includes a bitstring having a plurality of bits each of which indicates a destination;
- ANDing, in response to the receiving, the bitstring of the packet with a bitstring from the node to yield a new bitstring, the new bitstring comprising at least a first bit indicating a first destination and a second bit indicating a second destination;
- first forwarding the packet toward the first destination and the second destination based on the new bitstring such that packet is delivered to the first destination before the second destination;
- after the packet arrives at the first destination, changing the new bitstring to yield an updated bitstring;
- ANDing, in response to the packet arriving at the first destination, the bitstring of the packet with a bitstring from the first destination to yield a new updated bitstring; and
- second forwarding the packet toward the second destination according to the new updated bitstring.

16. The media of claim 15, wherein the first forwarding is also based on predetermined bit selection order that is based on a bit operation.

17. The media of claim 16, wherein the bit operation comprises one of find first set, count trailing zeros, or number of trailing zeros.

18. The media of claim 16, wherein the bit operation is based on an in-order.

19. The media of claim 16, wherein the bit operation is based on a shortest path scheme.

20. The media of claim 16, wherein the bit operation is based on a pseudo-random scheme.

* * * * *